March 11, 1969  F. C. STEVENS  3,432,212
INERTIA RESPONSIVE NONSKID SYSTEM
Filed Jan. 26, 1968

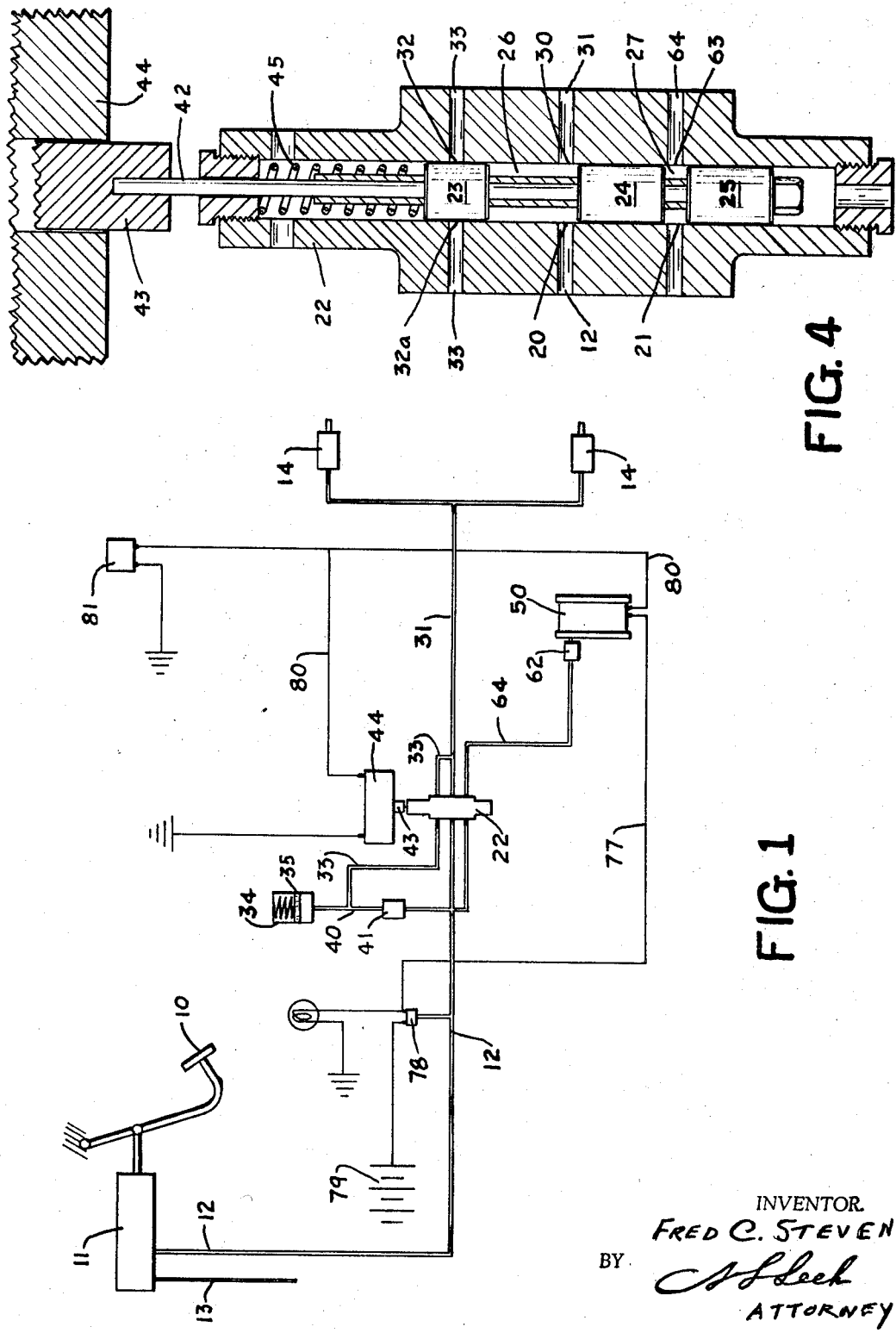

INVENTOR.
FRED C. STEVENS
BY
ATTORNEY

United States Patent Office 3,432,212
Patented Mar. 11, 1969

3,432,212
INERTIA RESPONSIVE NONSKID SYSTEM
Fred C. Stevens, 1 Garrett Place,
Bronxville, N.Y. 10708
Filed Jan. 26, 1968, Ser. No. 700,796
U.S. Cl. 303—21
Int. Cl. B60t 8/02, 13/00, 8/12
9 Claims

ABSTRACT OF THE DISCLOSURE

A nonskid braking system for hydraulically operated vehicle brakes including a shaft driven by or with the wheels and carrying an inertia wheel connected by a one way drive so that the wheel is normally driven by the shaft but is free to override the shaft when the latter decelerates. A solenoid operated control valve is connected to supply braking fluid from the master cylinder to the wheel brake cylinders under normal conditions but when the inertia wheel overrides the drive shaft, the control valve is actuated to disconnect the brake cylinders from the master cylinder and to connect them to a receiver which will receive some of the brake fluid therefrom so as to reduce the pressure on the brake cylinders.

---

This invention relates to nonskid braking systems for automotive vehicles and has for an object to provide a system of the above type which is effective to provide maximum braking effort for all road conditions.

Another object is to provide a system of the above type which is effective to prevent skid conditions from developing while not increasing the stopping distance of the vehicle.

Another object is to provide such a system having a control effect which varies as a function of both vehicle speed and road conditions.

Various other objects and advantages will be apparent as the nature of the invention is more fully disclosed. In the embodiment shown the system includes a shaft driven directly by one of the vehicle wheels or by the transmission so as to have a rate of rotation which varies directly as the rate of rotation of one or more of the vehicle wheels. This shaft will normally rotate at a rate corresponding to the vehicle speed and will decelerate with the wheels at a rate corresponding to the rate of deceleration of the vehicle provided there is no slippage of the wheels. However, if the wheels should begin to slip on the road surface, the shaft will reflect this condition by decelerating with the wheels at a faster rate than the vehicle.

The shaft carries an inertia wheel which is driven by the shaft through a one way drive member so that the inertia wheel normally rotates with the shaft but overrides the shaft when the shaft decelerates at an excessive rate. A brake actuated by brake fluid pressure bears against this inertia wheel so as to exert a drag proportional to the brake pressure. Hence, as the brake pressure is increased for increasing the rate of deceleration of the vehicle, the rate of deceleration of the inertia wheel is correspondingly increased so that the rate of the inertia wheel is at all times a function both of the speed of the vehicle and the rate of deceleration which the vehicle would have on a normal road surface for a given pressure of the foot brake pedal.

The inertia wheel is provided with an electrical contact which remains open as long as the inertia wheel and the shaft are rotating at the same speed but which becomes closed when the inertia wheel overrides the shaft, which condition would occur if the vehicle wheels begin to slip and thus decelerate at a faster rate than the vehicle.

The closing of the above contact energizes a solenoid actuated control valve which is connected to interrupt the supply of brake fluid to the wheel brake cylinders and to allow the brake cylinders to discharge some of the brake fluid to a receiver so as to reduce the braking effect on the wheels. This continues until the wheels resume turning without slippage at which time the shaft again rotates at the same rate as the inertia wheel and opens the electrical contact to deenergize the solenoid of the control valve and restore the system to normal braking operation.

The above cycle of operation is effective to sense approaching skid conditions before the wheels have had a chance to become locked. The skid condition is anticipated and corrected before a skid actually occurs. At the same time the wheels are subjected to the maximum braking force that they can absorb under the existing road conditions.

The nature of the invention and its method of operation will be better understood from the following description, taken in connection with the accompanying drawings in which a specific embodiment has been set forth for purposes of illustration.

In the drawings:

FIG. 1 is a diagrammatic view illustrating a system embodying the present invention;

FIG. 4 is a longitudinal section through the solenoid actuated pressure control valve.

Figure 3:
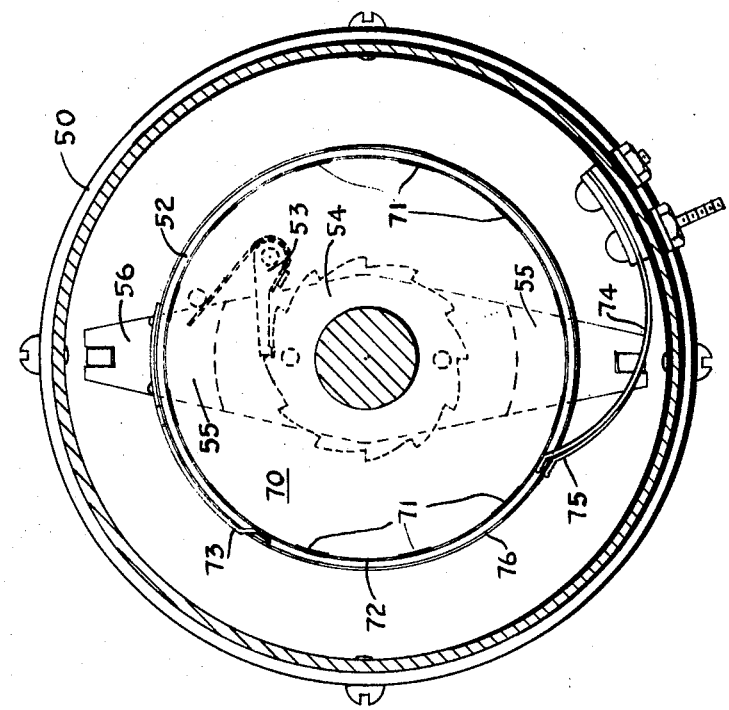
FIG. 3 is a transverse section taken on the line 3—3 of FIG. 2.

Referring to the drawings more in detail, the system is shown in FIG. 1 as applied to a vehicle having hydraulic brakes and having a brake pedal 10 to be actuated by the driven and connected to actuate a master hydraulic cylinder 11 for applying fluid pressure through lines 12 and 13 to the wheel brake cylinders of the vehicle. The line 12 is shown as connected to brake actuating cylinders 14 on the rear wheels of the vehicle. The line 13 may be connected to actuate the front wheel brakes of the vehicle. While the system is shown as connected to the rear wheel brakes it may be connected to control all of the brakes, if desired.

In the embodiment shown, the line 12 is connected to inlet ports 20 and 21 of a control valve cylinder 22 having three pistons 23, 24 and 25 spaced apart to provide chambers 26 and 27 respectively therebetween. The ports 20 and 21 communicate with the chambers 26 and 27 respectively when the pistons are in their lower or advanced position but are closed by pistons 24 and 25 respectively when the latter are in their raised or retracted position.

When pistons 23 and 24 are advanced, chamber 26 also communicates through port 30 and line 31 with the rear brake actuating cylinders 14. When pistons 23 and 24 are retracted, chambers 26 establishes communication from line 31 through ports 32 and 32a and line 33 to receiver 34 having a spring actuated plunger 35 adapted to maintain the fluid in the receiver under a pressure slightly in excess of the static fluid pressure when the brake pedal is released.

The receiver 34 is connected by a line 40, through a check valve 41, to the line 12 for returning the fluid to the system when the pressure in the system is restored to normal by the release of the foot pedal 10.

The pistons 23, 24 and 25 are connected to be actuated in unison by a shaft 42 which is connected to the plunger 43 of a solenoid 44 and are arranged to be retracted when the solenoid is energized and to be advanced by a return spring 45 when the solenoid is deenergized.

Figure 2:
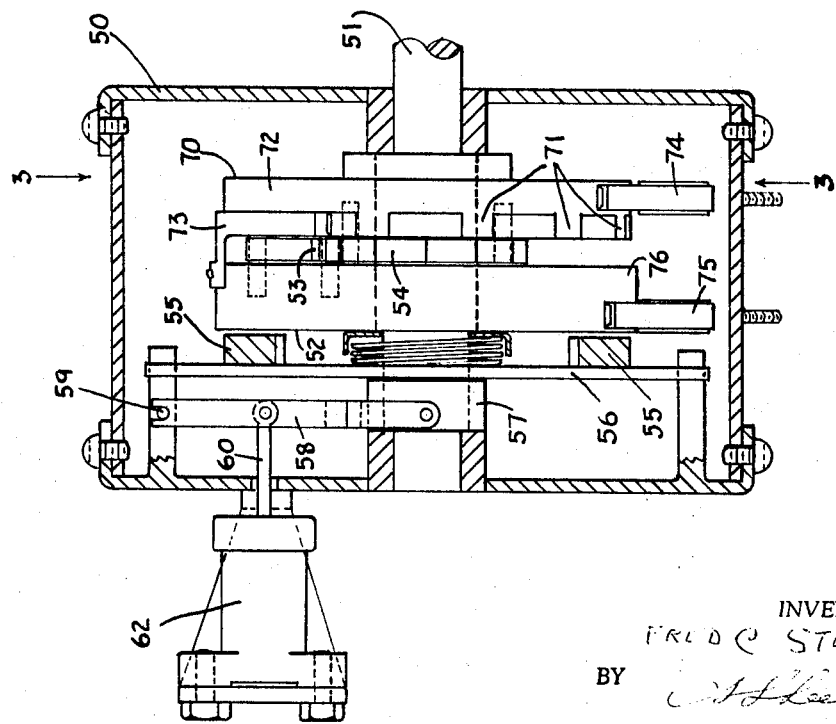
FIG. 2 is a side elevation, partly in section, of the sensing device.

The deceleration sensing unit is shown in FIG. 2 as comprising housing 50 carrying a shaft 51 which is connected to be driven by a gear from the transmission or from the drive shaft or one of the rear wheels of the vehicle. The shaft 51 carries an inertia wheel 52 which is mounted to be driven by a one way drive mechanism comprising a pawl 53 carried by the inertia wheel 52 and a ratchet wheel 54 mounted to rotate with shaft 51 so that the inertia wheel rotates with the shaft 51 and is driven thereby but is free to override the shaft when the shaft decelerates at a more rapid rate than the inertia wheel. A pair of brake pads 55 are carried on an arm 56 having a collar 57 around the shaft 51. The collar 57 is shifted by an arm 58 which is pivoted at 59 and is actuated by a piston rod 60 from a brake cylinder 62. The control valve chamber 27 is connected through port 63 and line 64 to the brake cylinder 62 to apply fluid pressure to the brake cylinder 62 corresponding to the pressure applied to the wheel brake cylinders 14. The ports 21 and 63 are arranged to be open when the pistons are in their advanced position but are closed by the piston 25 when the latter is retracted. Thus, the retraction of the pistons cuts off the fluid pressure to the brake cylinders 14 and to the brake cylinder 62 of the sensing device. At the same time, the brake cylinders 14 are connected through the control valve chamber 26 and the lines 31 and 33 to the receiver 34 so that some brake fluid is allowed to flow from the wheel brake cylinders into the receiver, thereby reducing the fluid pressure in the brake cylinders and releasing the drag on the wheels.

At the same time, the fluid pressure in the cylinder 62 is maintained so that the braking effect on the inertia wheel is held at a value corresponding to the original brake fluid pressure.

The brake on the inertia wheel 52 is so set that the inertia wheel is decelerated by the brake pads 55 at a rate corresponding to the rate at which the vehicle wheels would be decelerated at the same brake pressure on a road surface having the maximum friction on the tires. Thus, under normal driving conditions the inertia wheel 52 and the shaft 51 would decelerate at the same rate and the present system would not be brought into operation. However, if the vehicle wheels start to decelerate at a faster rate which would indicate incipient skid conditions, the shaft 51 decelerates faster than the inertia wheel 52 and the latter overrides the shaft 51 by reason of its one way drive.

For sensing this condition, a contact disc 70 is fixed to the shaft 51 and carries the ratchet wheel 54 and a series of spaced contacts 71, equal in number to the teeth on the ratchet wheel, and a slip ring 72 connected to the contacts 71. A brush 73 carried by the inertia wheel 52 rides on the spaced contacts 71 and a brush 74 carried on the casing 50 rides on the slip ring 72. A brush 75 carried by the housing rides on a slip ring 76 on the inertia wheel 52. The brush 75 is connected by a line 77 through the stop light switch 78 to the vehicle battery 79. The brush 74 is connected by line 80 to solenoid 44.

The pawl 53 and ratchet 54 are so arranged that the shaft 51 picks up the drive on the inertia wheel 52 in a position such that the brush 73 on the inertia wheel rests between successive contacts 71 and the circuit to the solenoid 44 is open. As soon as the inertia wheel overrides the shaft, one of the contacts 71 is closed and a circuit is completed to the solenoid 44 to retract the control valve pistons and bring the nonskid system into operation. The ports 20, 21, 30 and 63 are disposed to be closed rapidly by the retraction of the pistons but the axial length and range of movement of the pistons 24 and 25 is such that the ports do not reopen in the short interval between pulses of the solenoid should the inertia wheel override the shaft sufficiently to open and close a plurality of contacts 71 in rapid succession as the brush 73 rides thereover.

In operation, if conditions arise such that the inertia wheel 52 overrides the shaft 51 and closes a contact 71, the solenoid control valve is retracted to break the communication between the master cylinder 11 and the hydraulic cylinders 14 which actuate the wheel brakes and the cylinder 62 which actuates the inertia wheel brake. This causes the inertia wheel to continue to decelerate at its normal rate but allows fluid from the wheel brake cylinders 14 to flow into the receiver 34 at a rate determined by the diameter of line 33 until the fluid pressure in cylinders 14 is reduced to a value such that the wheels again rotate at their normal decelerated rate. When this occurs the shaft 51 catches up with the inertia wheel and again picks up and drives such wheel. The contact 71 is broken, the solenoid released and the system is restored to normal braking operation.

The inertia wheel indicates the rate of wheel deceleration which would obtain at a given vehicle speed in response to the particular brake pedal pressure being applied, under conditions of no wheel slippage. If the actual rate of deceleration of the vehicle wheels is greater than the indicated rate due to wheel slippage, the present system operates to reduce the brake pressure until slippage is eliminated and the rates again become equal. Hence, the braking effort is maintained at the maximum value that the wheels can absorb without slipping and the vehicle is brought to rest in the shortest distance that the road surface permits.

A tell-tale signal 81, such as a buzzer, may be placed under the dash and connected in parallel with the solenoid 44, in order to give the driver an audible indication that the nonskid mechanism has been actuated, and that his brake pedal pressure is excessive for the road conditions then obtaining.

What is claimed is:

1. A nonskid braking system comprising a master cylinder to be operated by the driver, hydraulic cylinders to actuate the wheel brakes of the respective wheels, lines connecting the master cylinder to said wheel brake cylinders, a first rotatable member connected to be driven at a rate proportional to the rate of rotation of at least one of the vehicle wheels, a rotatable inertia member, a one way drive mechanism connecting said first rotatable member to drive said rotatable inertia member and to permit free rotation of said inertia member when the first member decelerates faster than said inertia member, brake mechanism actuated by a hydraulic cylinder connected to exert a drag on said inertia member, a line connecting said last hydraulic cylinder to said master cylinder whereby the drag on said inertia member is made proportional to the fluid braking pressure, a control valve normally connecting said master cylinder to said wheel brake cylinders and to said inertia member brake cylinder, a fluid receiver, and means responsive to the over running of said inertia member with respect to said first rotatable member to shift said valve in a manner to disconnect all of said brake cylinders from said master cylinder and to connect said wheel brake cylinders to said receiver whereby some of the brake fluid is discharged from the wheel brake cylinders into said receiver to reduce the brake pressure on the vehicle wheels.

2. A braking system as set forth in claim 1 in which said first rotatable member is a shaft and said inertia member is a wheel journalled on said shaft.

3. A system as set forth in claim 1 in which said valve is solenoid operated and an electric contact is closed by the overrunning of said inertia member to energize said solenoid.

4. Apparatus as set forth in claim 1 in which a series of contacts are carried by one of said rotatable members and a brush carried by the other of said rotatable members is positioned to close said contacts in response to relative movement between said members.

5. A system as set forth in claim 4 in which said shaft includes means for holding said contact open when said inertia member is being driven by and at the same rate as said shaft.

6. Apparatus as set forth in claim 1 in which said valve comprises a cylinder having a series of pistons therein spaced axially to form valve chambers therebetween, one of said chambers having ports connected to control the fluid supply to said wheel brake cylinders and the other of said chambers having ports connected to control the supply of fluid to said inertia member brake cylinder when said pistons are in advance position and to interrupt such connections when said pistons are in retracted position.

7. A system as set forth in claim 6 including a receiver, said valve having ports connecting said wheel brake cylinders to said receiver through said first chamber when said pistons are in retracted position.

8. Apparatus as set forth in claim 7 in which said ports are disposed to be closed rapidly when said pistons are retracted and means is provided to retard the opening of said ports.

9. Apparatus as set forth in claim 1 in which said valve is solenoid operated and said solenoid is connected to be energized through a contact which is normally open but is closed when said inertia member overrides said first rotatable member.

References Cited

UNITED STATES PATENTS 3,014,764   12/1961   Heckendorf _____ 303—21

MILTON BUCHLER, *Primary Examiner.*

JOHN J. McLAUGHLIN, JR., *Assistant Examiner.*

U.S. Cl. X.R.

188—181; 303—6